(12) United States Patent  
Cantor (10) Patent No.: US 8,062,036 B2  
(45) Date of Patent: Nov. 22, 2011

(54) THERAPEUTIC TOOL AND METHOD FOR USE THEREOF

(76) Inventor: David Cantor, West Hartford, CT (US)

(*) Notice: Subject to any disclaimer, the term of this patent is extended or adjusted under 35 U.S.C. 154(b) by 424 days.

(21) Appl. No.: 12/026,292

(22) Filed: Feb. 5, 2008

(65) Prior Publication Data

US 2008/0220401 A1 Sep. 11, 2008

Related U.S. Application Data

(60) Provisional application No. 60/899,520, filed on Feb. 5, 2007.

(51) Int. Cl.
*G09B 19/00* (2006.01)

(52) U.S. Cl. ........ 434/236; 434/284; 434/285; 434/287; 434/291

(58) Field of Classification Search .................. 434/236, 434/277, 278, 284–293, 365
See application file for complete search history.

(56) References Cited

U.S. PATENT DOCUMENTS

| | | | | |
|---|---|---|---|---|
| 3,107,439 A * | 10/1963 | Parr et al. | ...... | 434/281 |
| 3,355,820 A * | 12/1967 | Brumlik | ...... | 434/278 |
| 3,458,949 A * | 8/1969 | Young | ...... | 446/124 |
| 4,008,534 A * | 2/1977 | Swartz | ...... | 40/431 |
| 6,565,360 B1 * | 5/2003 | Kavvouras | ...... | 434/284 |
| 6,722,890 B2 * | 4/2004 | Kiel | ...... | 434/290 |

* cited by examiner

*Primary Examiner* — Gene Kim
*Assistant Examiner* — Joseph B Baldori
(74) *Attorney, Agent, or Firm* — Cantor Colburn LLP (57) ABSTRACT

A therapeutic tool for use with a patient in psychotherapy is provided, the tool includes a central gyroscopic element, a plurality of concentric rings extending around the central gyroscopic element, and a plurality of outer elements removably disposed on the rings and configured to be movable around the rings, wherein the rings are pivotally associated with the gyroscopic ball, and wherein the gyroscopic element is configured to represent a seeing self of the patient and the rings are configured to represent a plurality of subpersonalities of the patient.

5 Claims, 14 Drawing Sheets

THERAPEUTIC TOOL AND METHOD FOR USE THEREOF

CROSS REFERENCE TO RELATED APPLICATION

This application is related to U.S. Provisional Patent Application Ser. No. 60/899,520 filed on 5 Feb. 2007, the contents of which are herein incorporated by reference in their entirety.

BACKGROUND OF THE INVENTION

The invention relates to a therapeutic tool and an associated method for use in psychotherapy and, more particularly, to a tool for implementing the Internal Family Systems(sm) model of psychotherapy and for specifically representing the seeing self and the various subpersonalities of a patient.

BRIEF SUMMARY OF THE INVENTION

A therapeutic tool for use with a patient in psychotherapy is provided, the tool includes a central gyroscopic element, a plurality of concentric rings extending around the central gyroscopic element, and a plurality of outer elements removably disposed on the rings and configured to be movable around the rings, wherein the rings are pivotally associated with the gyroscopic ball, and wherein the gyroscopic element is configured to represent a seeing self of the patient and the rings are configured to represent a plurality of subpersonalities of the patient.

A method for using a therapeutic tool with patients in psychotherapy is also presented herein. The tool includes a central gyroscopic element, a plurality of concentric rings extending around the central gyroscopic element, a plurality of outer elements removably disposed on the rings and configured to be movable around the rings, and a plurality of cards presenting a plurality of response situations. The disclosed method is essentially an interactive game to be played by a number of patients, the game includes a first of the patients selecting one of the plurality of cards, the first patient anticipating a second patient's reaction to the response situation on the selected card, the first patient disposing the outer elements on a selected one of the concentric rings which represents the anticipated reaction, and maintaining the outer elements on the selected ring if the anticipated reaction corresponds to an actual reaction of the second patient.

DETAILED DESCRIPTION OF THE INVENTION

A therapeutic tool and method for using the tool are provided herein. The tool is generally called See(3) From Your Self Therapy Orb and is hereinafter referred to as the Self-See3 and/or as the $Self_C$ Mini. Generally and as will be elaborated on herein, the $Self_C$ Mini is a self communication orb, that is, a tool to communicate with yourself and to others.

The Self-See3 is a tangible therapeutic tool and visual model as is shown illustratively in FIGS. 1-21. The Self-See3 is specifically designed for interactive use in the instruction, supervision and practice of psychotherapy. The Self-See3 is an expression, principally, of the Internal Family Systems (sm) model of psychotherapy which posits that individuals possess a central witnessing "Self" or seer and three (3) types of "Parts" or subpersonalities, which when in extreme states or burdens, benefit from being seen and accessed by the Self.

Figure 1:
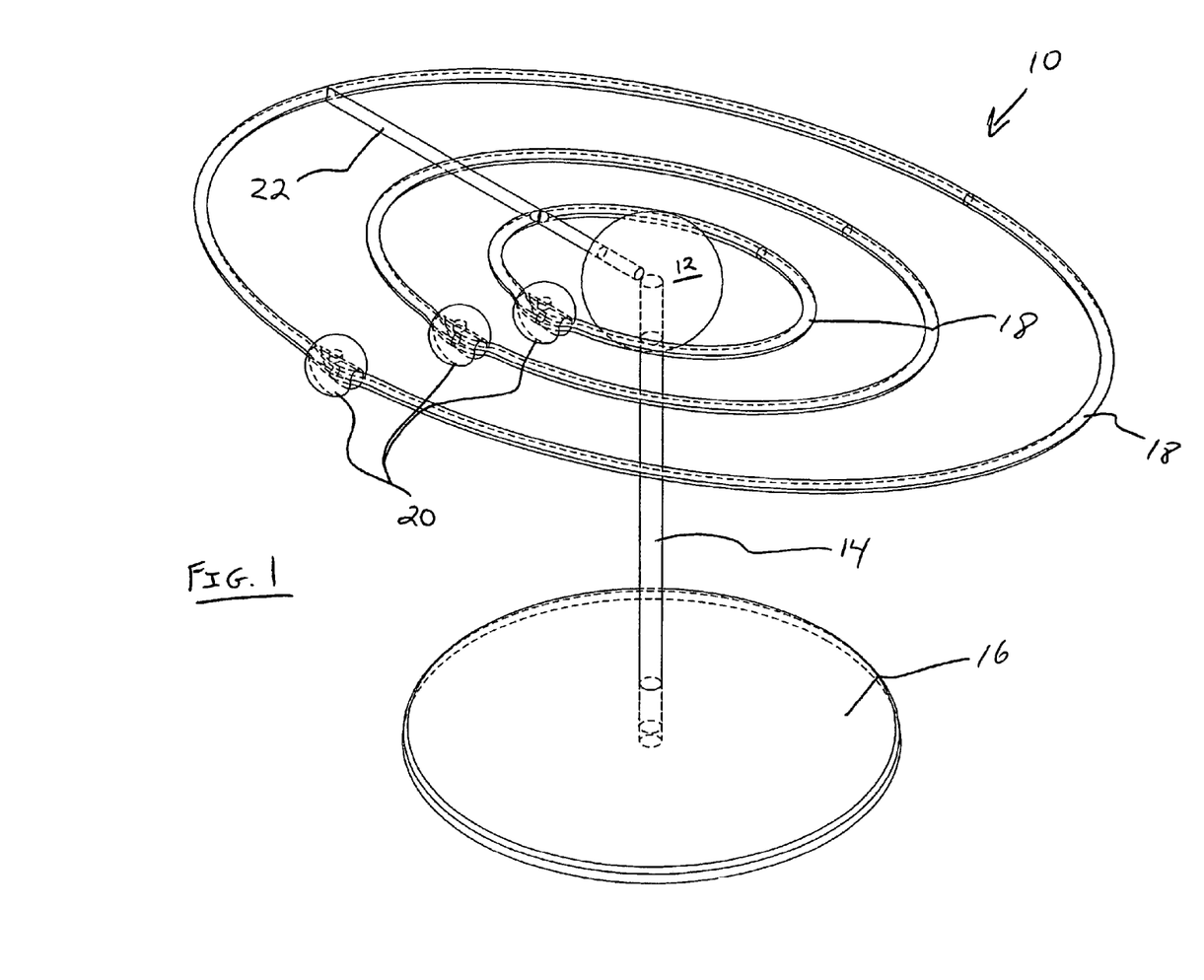
FIG. 1 is a perspective view of a therapeutic tool in one embodiment of the invention.
Figure 2:
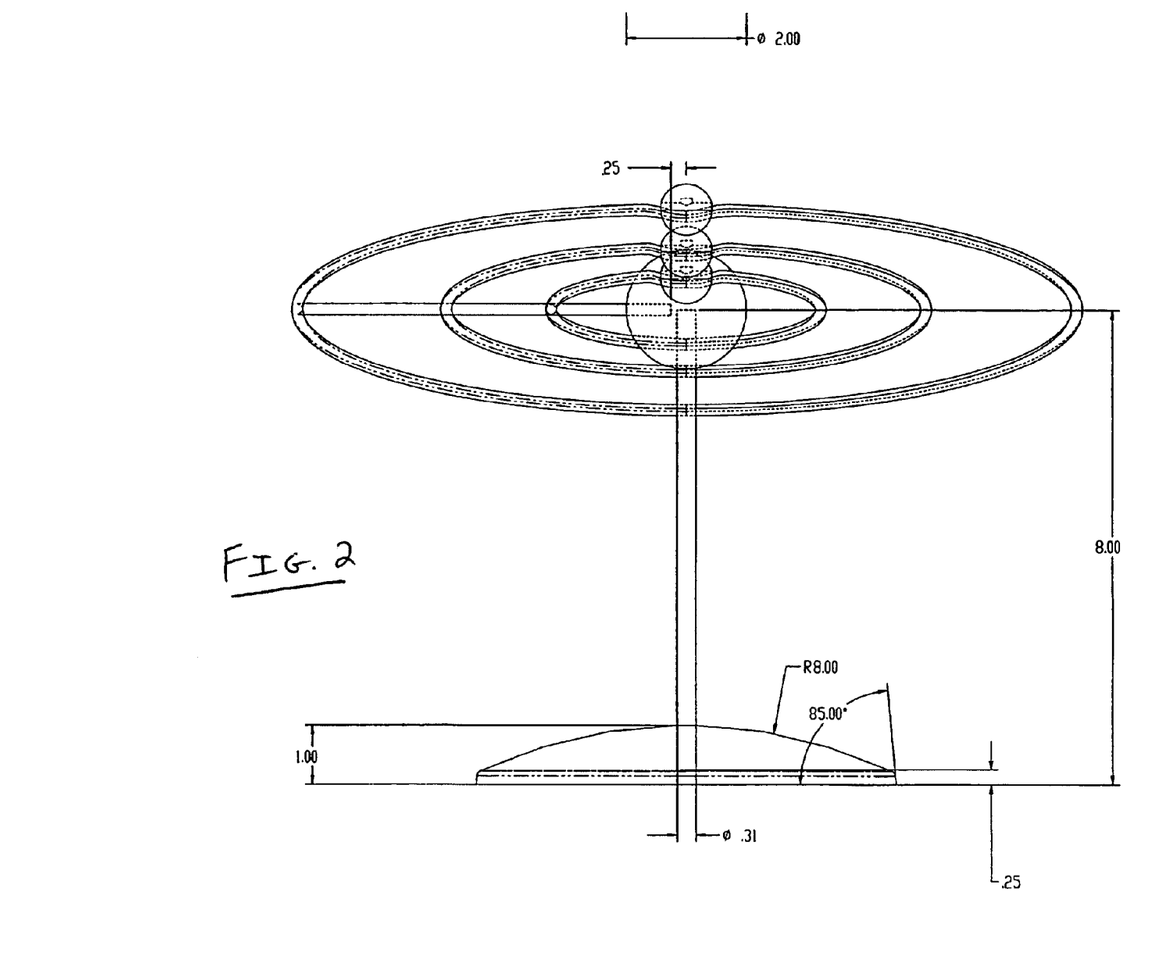
FIG. 2 is a side elevation view thereof.
Figure 3:
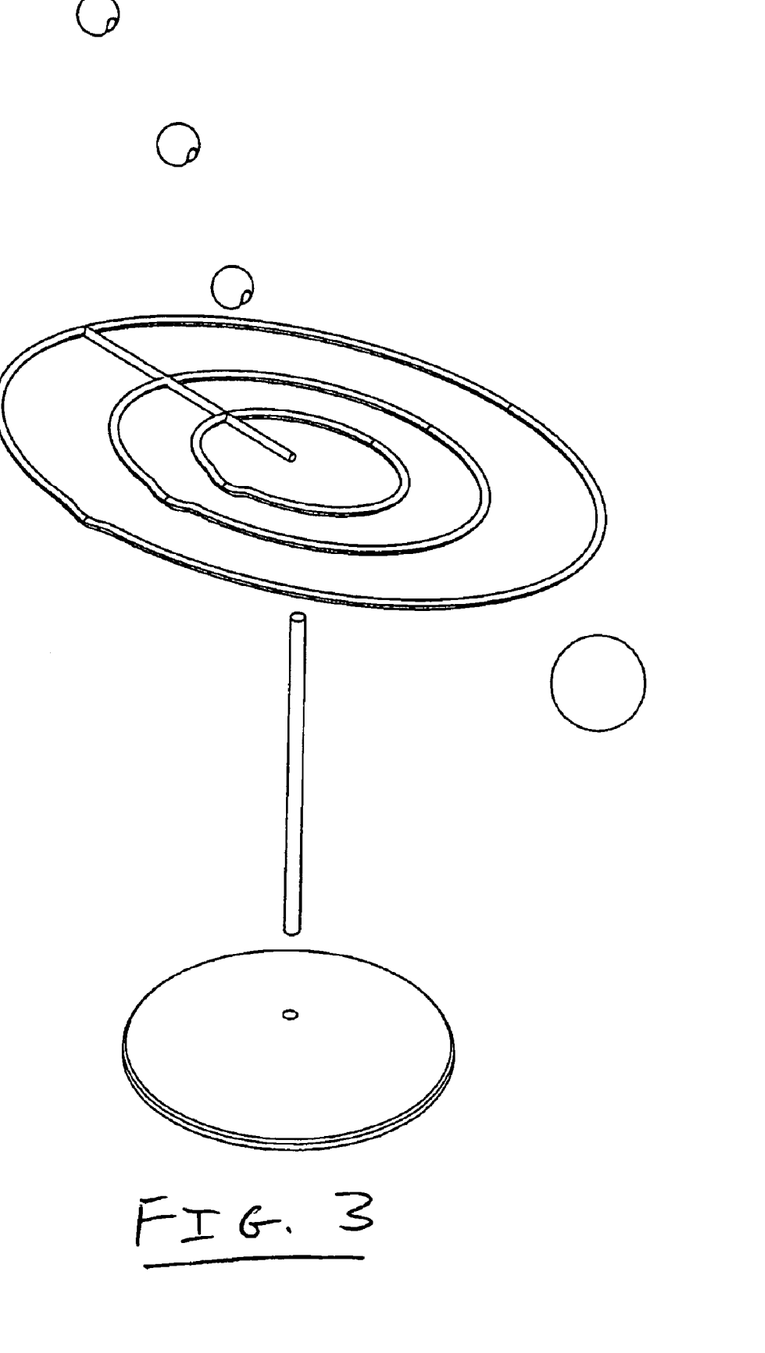
FIG. 3 is a perspective exploded view thereof.
Figure 4:
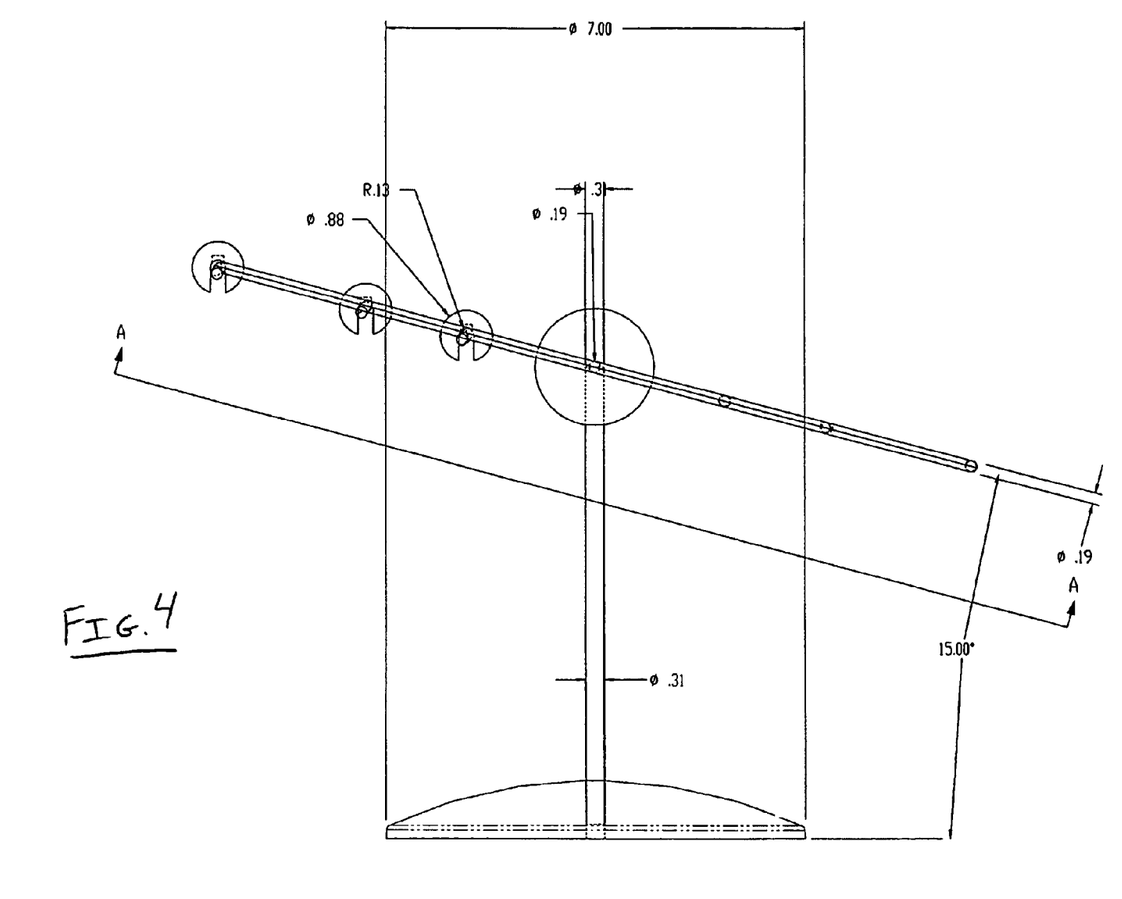
FIG. 4 is a another side elevation view thereof.
Figure 5:
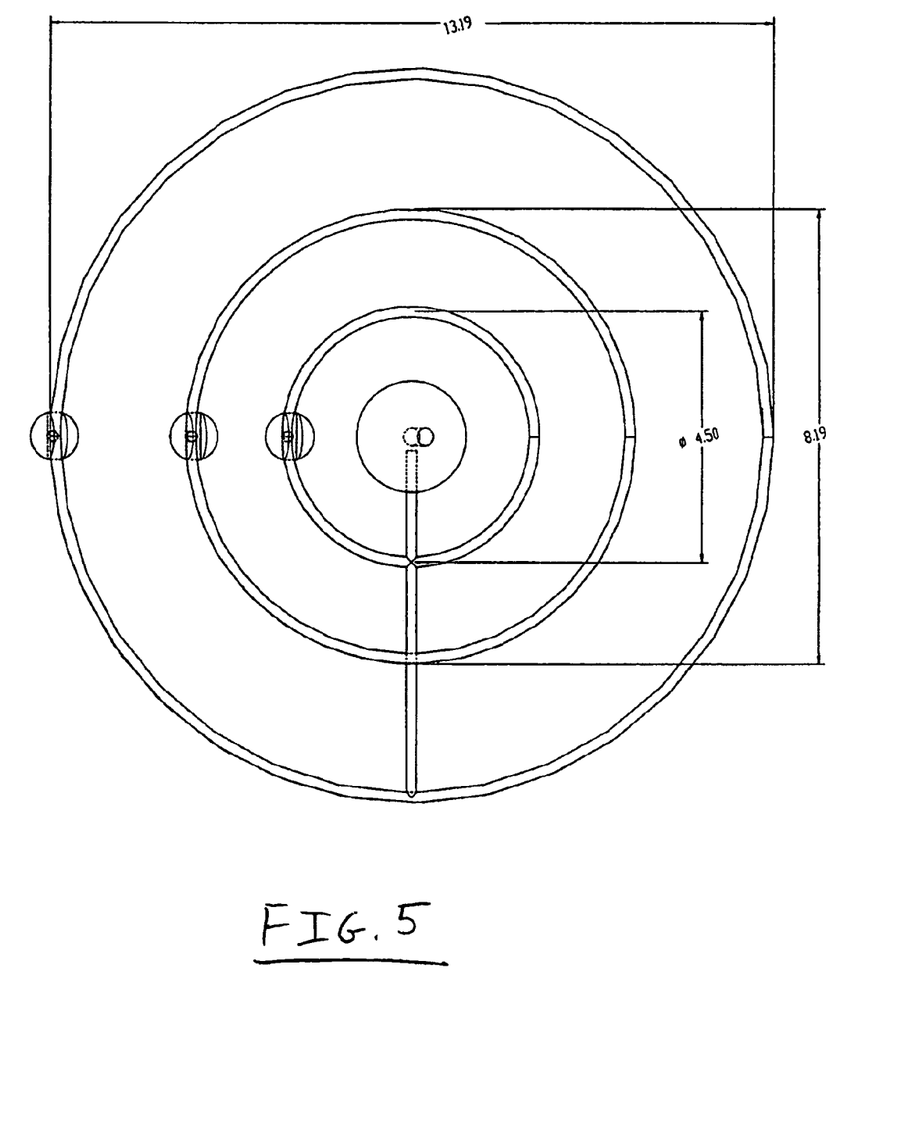
FIG. 5 is a top plan view thereof.
Figure 6:
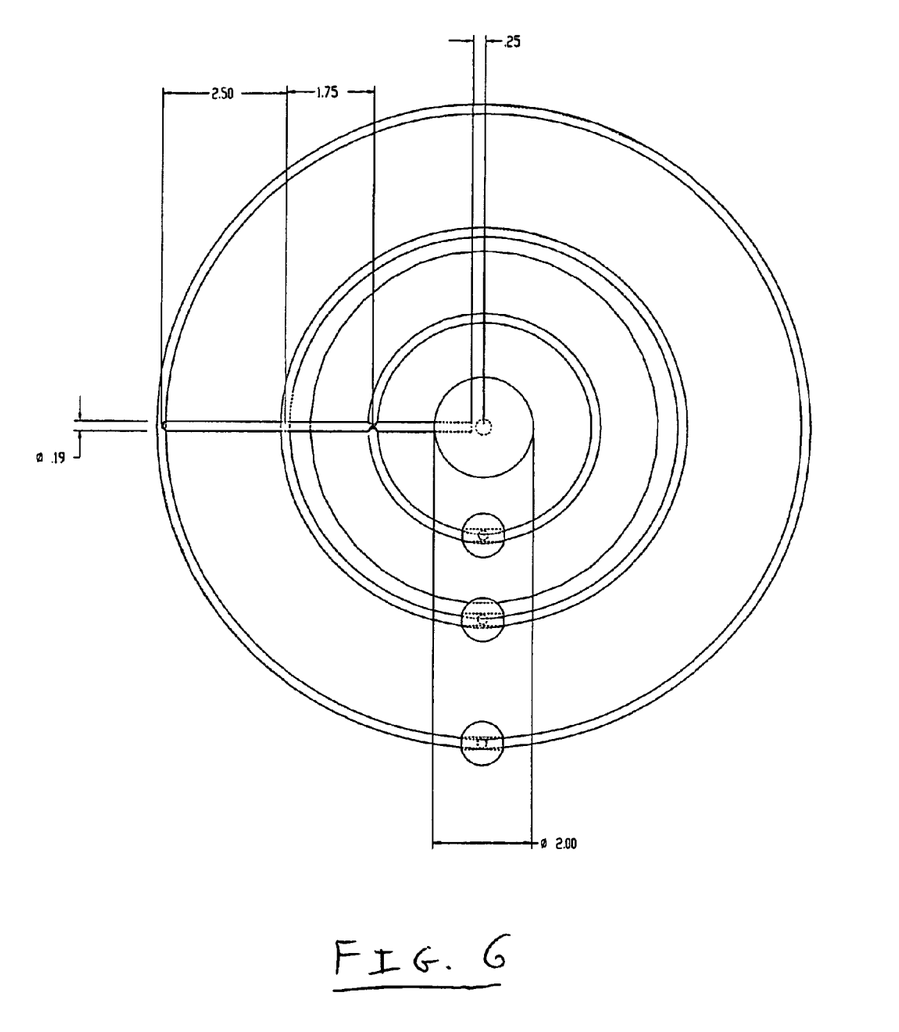
FIG. 6 is another top plan view thereof.
Figure 7:
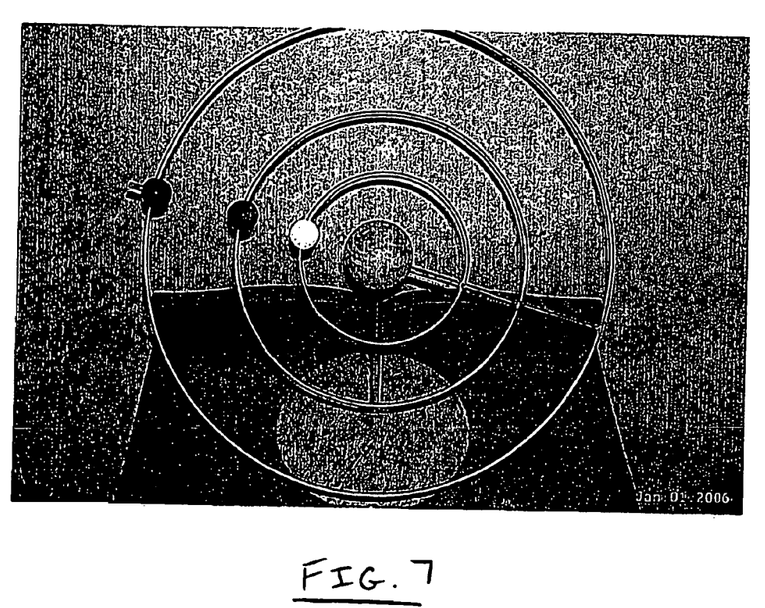
FIGS. 7-21 are various additional perspective views thereof.
Figure 8:
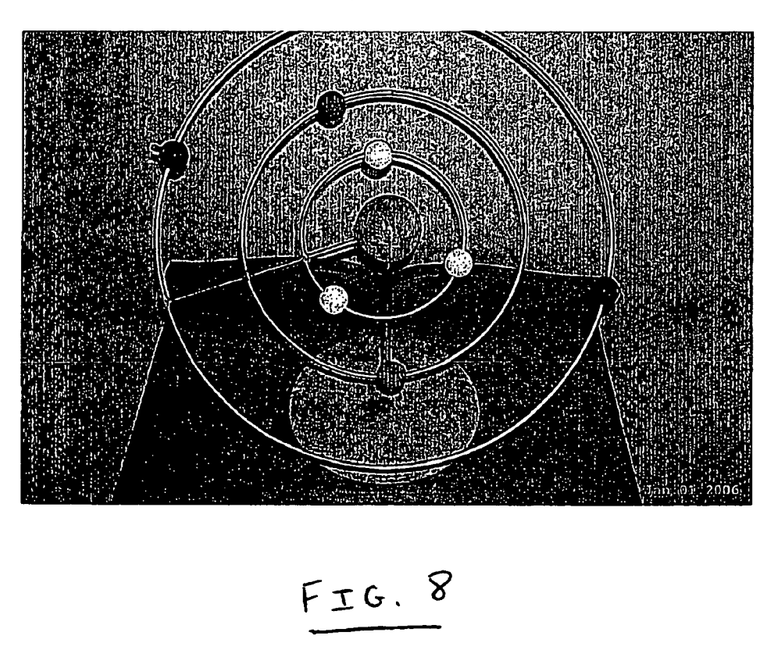
Figure 9:
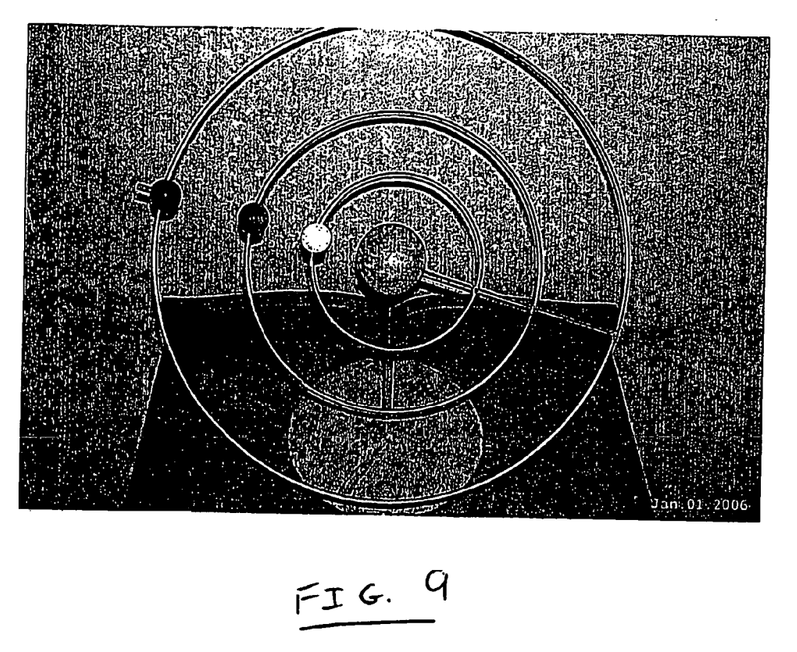
Figure 10:
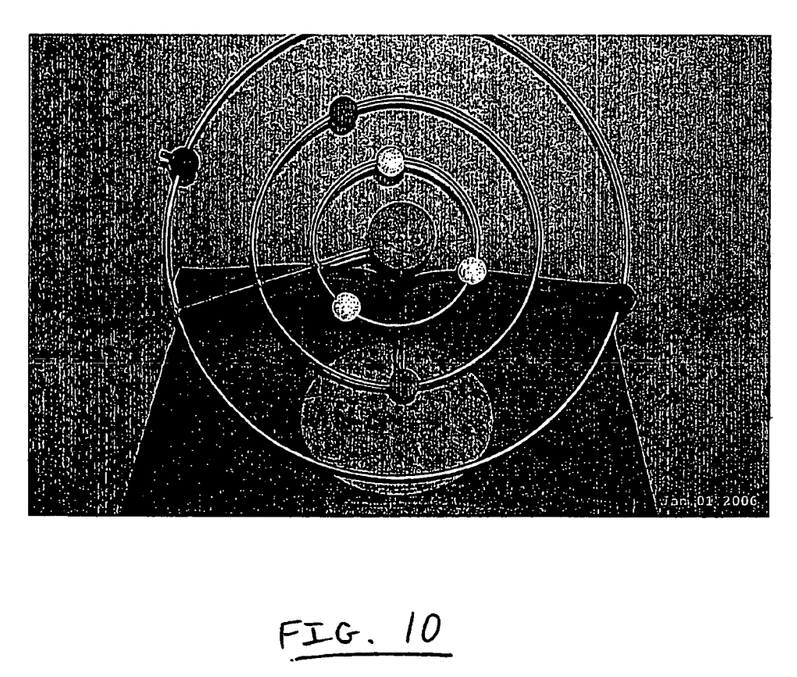
Figure 11:
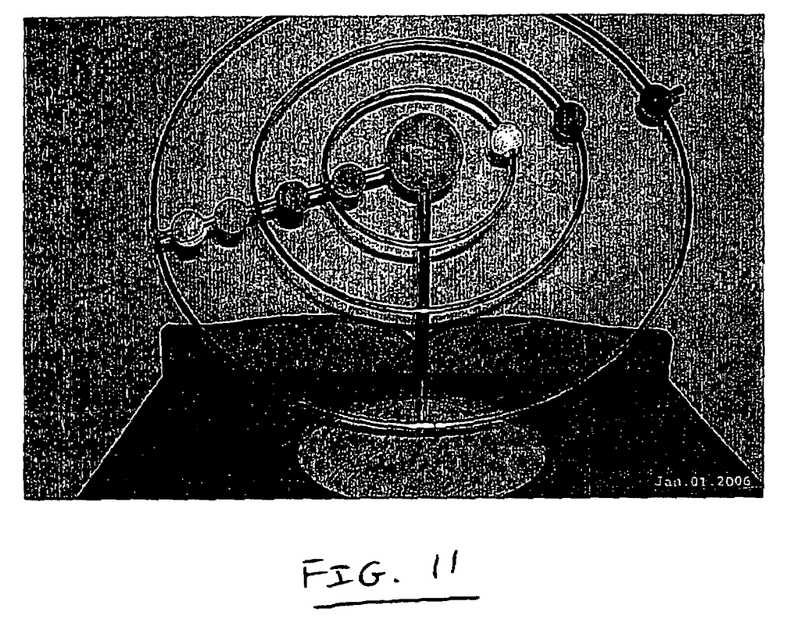
Figure 12:
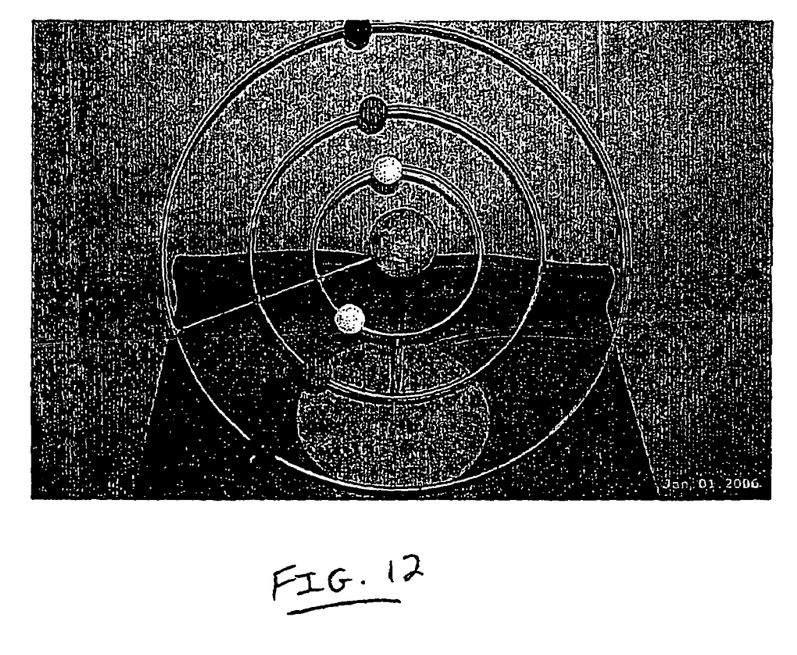
Figure 13:
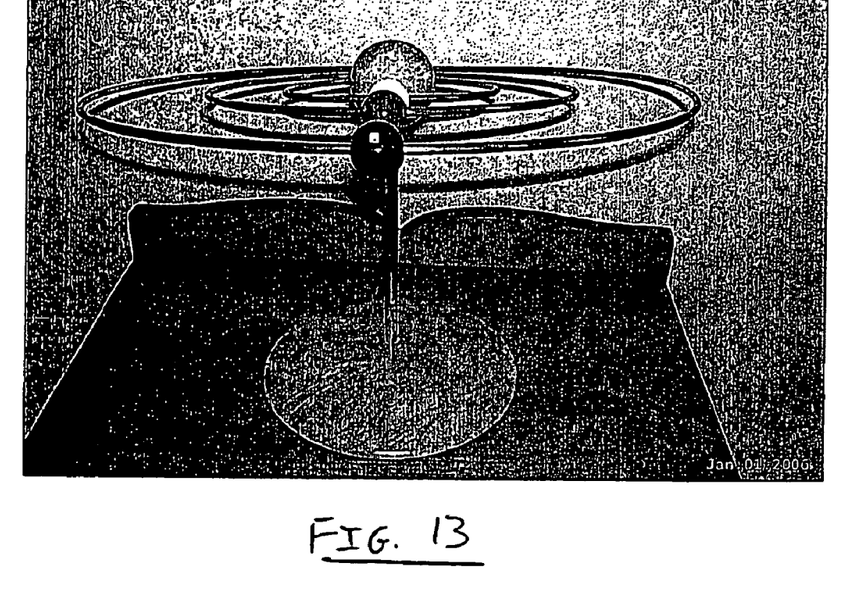
Figure 14:
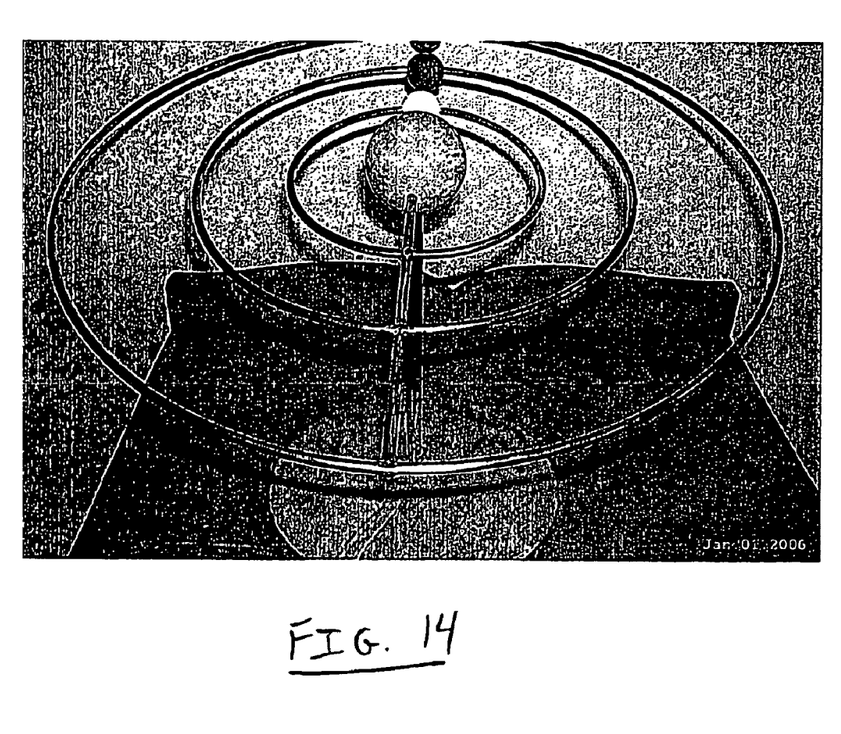
Figure 15:
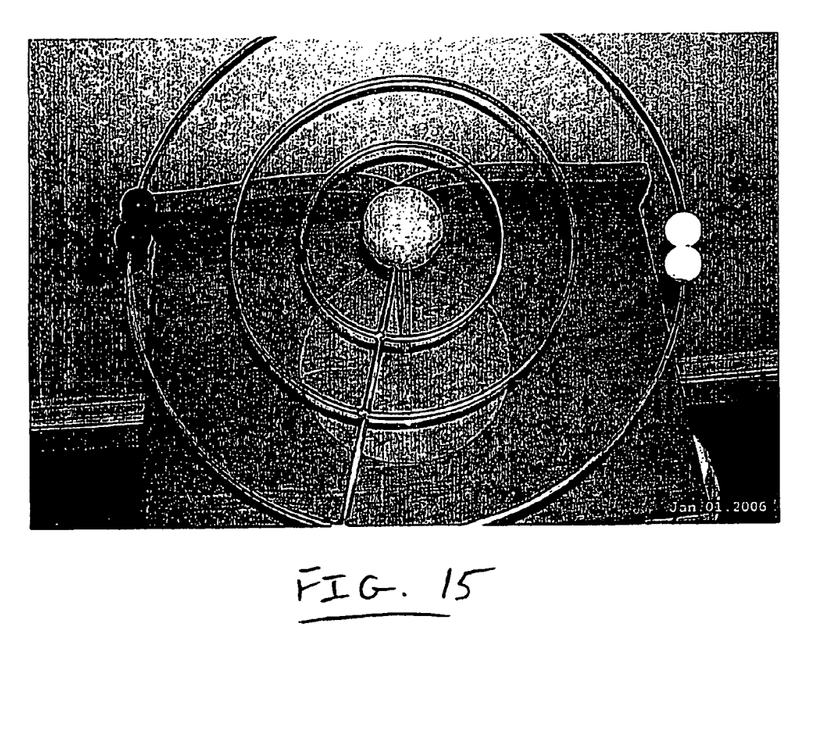
Figure 16:
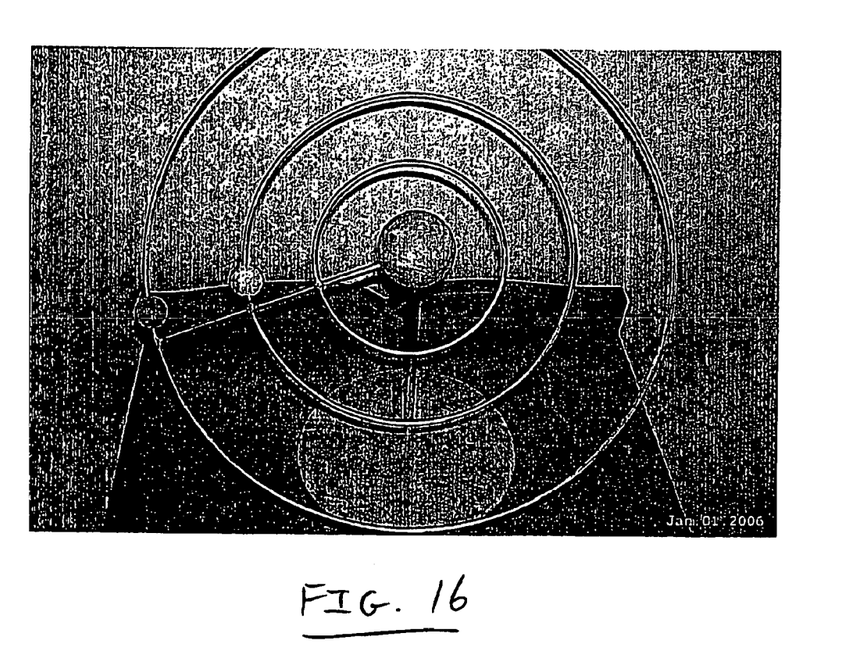
Figure 17:
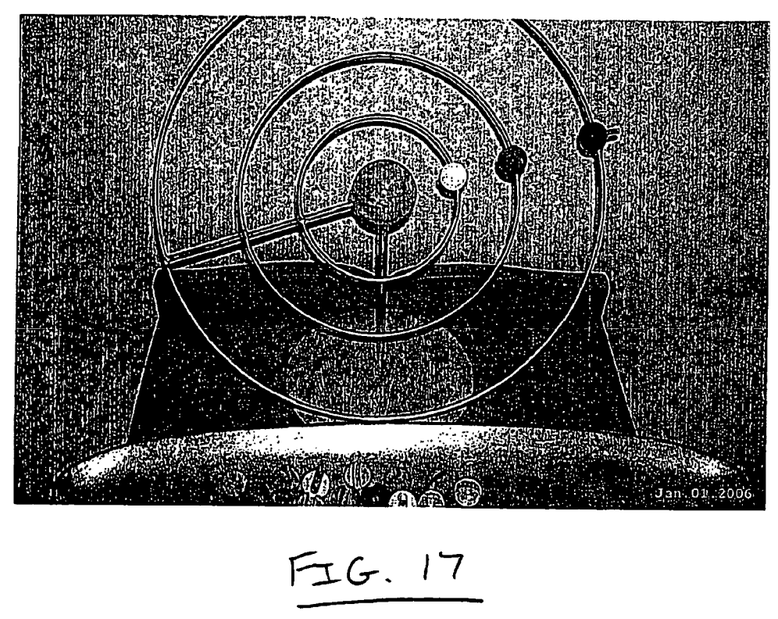
Figure 18:
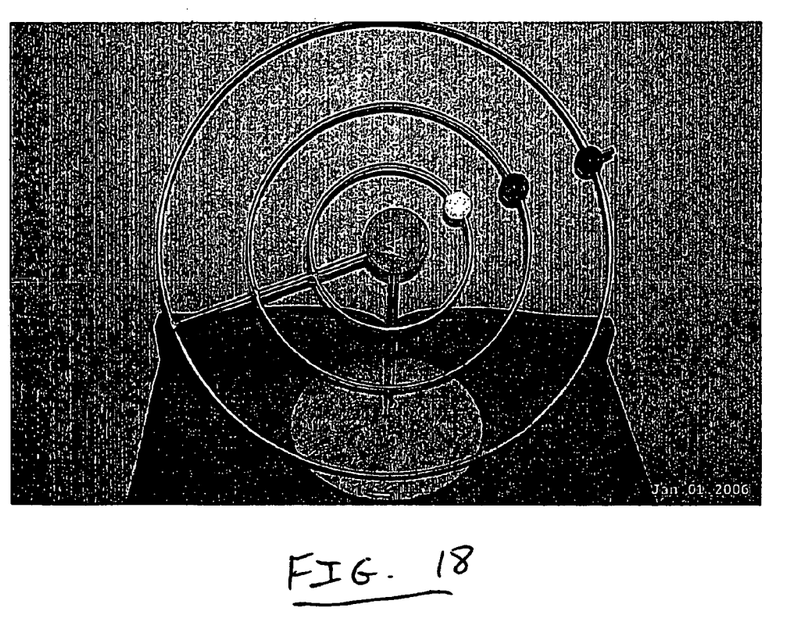
Figure 19:
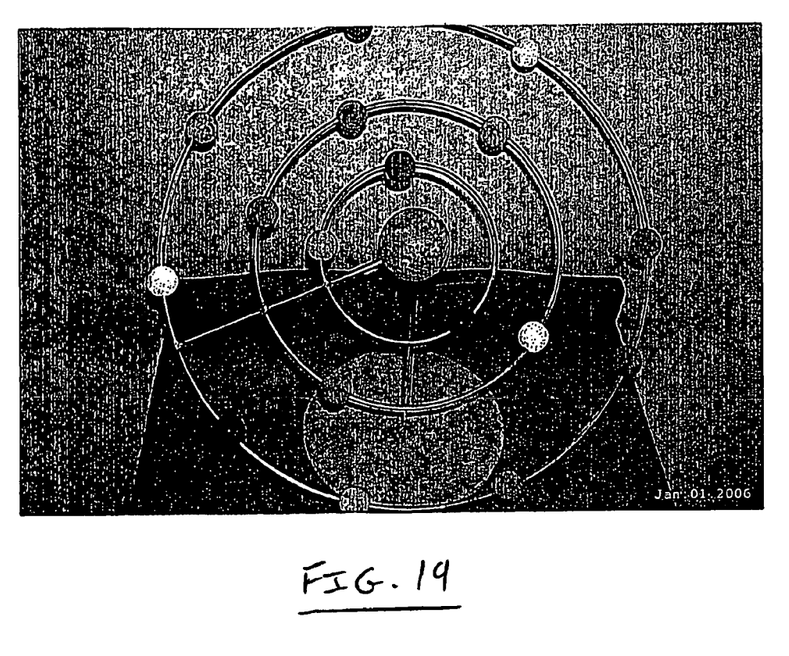
Figure 20:
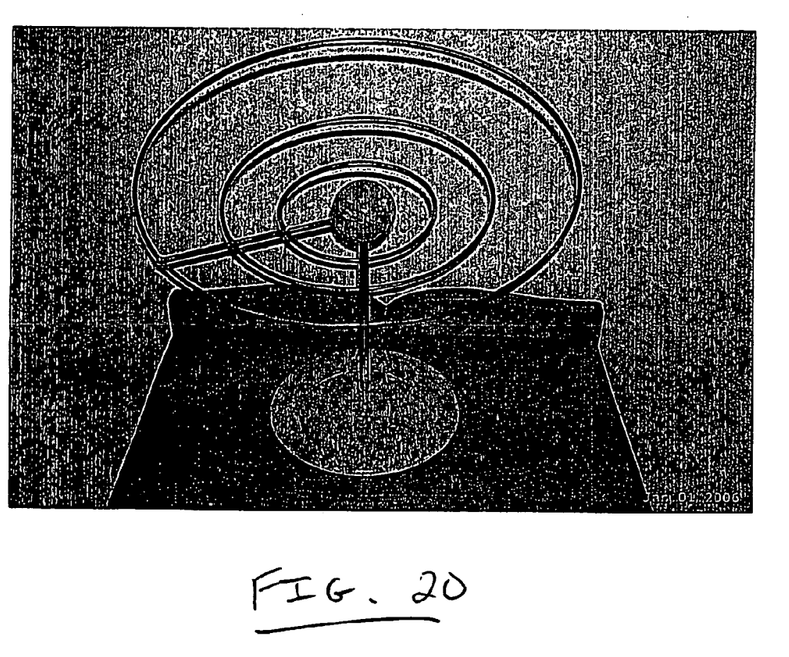
Figure 21:
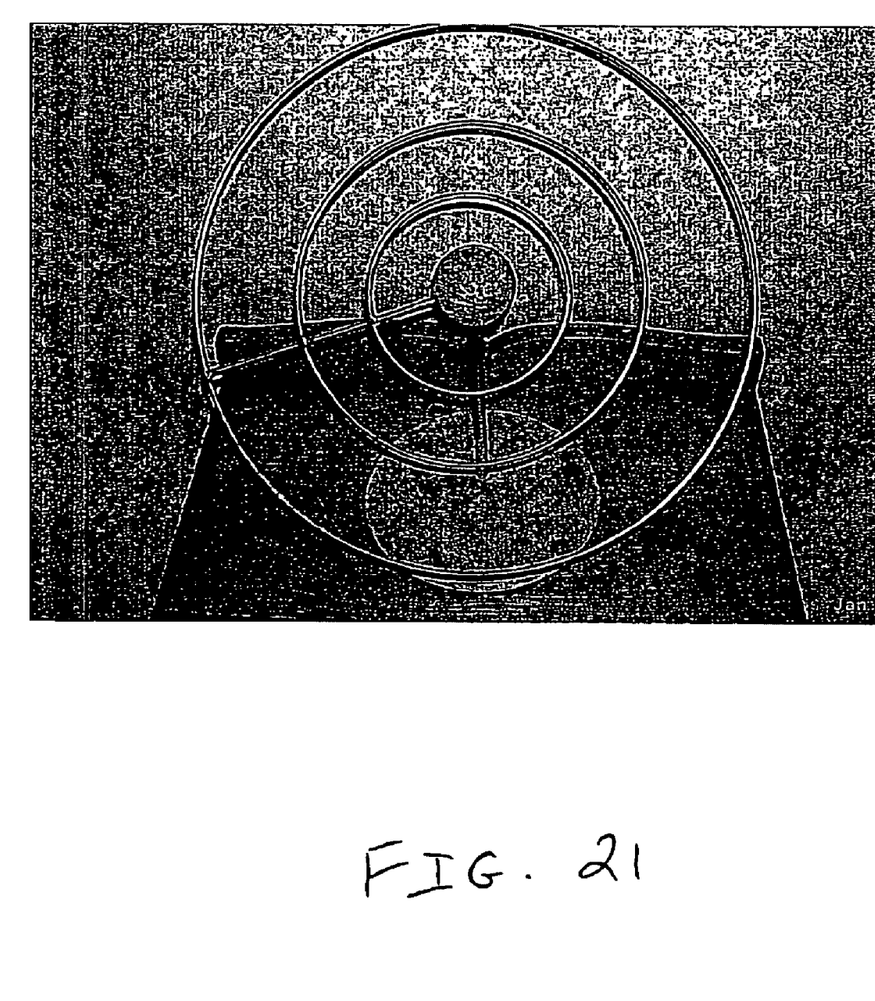

With reference to FIG. 1, the Self-See3 10 comprises a central gyroscopic ball 12 representing the seeing Self, supported structurally by a rod 14 attached at its south pole extending to a standing base 16 and three tiltable concentric rings 18 with attachable balls 20 to represent the three types of Parts, supported structurally by a rod 22 connecting the rings and attached to the side of the central ball 12. Balls 20 placed on the inner ring 18 represent specific "Manager" Parts or Parts that proactively attempt to prevent an individual from experiencing potentially painful feelings; balls 20 placed on the middle ring 18 represent specific "Firefighter" Parts or Parts that are reactive in their protection against the experience of painful feelings and balls 20 placed on the outer ring 18 represent specific "Exile" Parts or younger more vulnerable Parts that have experienced pain and as a consequence are carrying burdens or self-limiting beliefs and emotions. This outer ring 18 has a greater relative radius than the inner and middle rings 18 indicative of the Exiles emotional distance from the Self.

The Self-See3 is specifically designed to perform three (3) primary functions: First, as a visual model which displays a free standing constant Self (central ball) in relationship to, but not the same as, the Parts (smaller balls on concentric rings). Thus, individuals realize that they have a witnessing or seeing Self that is distinct from, and therefore in a position to heal, their Parts. Second, to help individuals unblend or differentiate their Self from their extreme and burdened Parts so they can see their Parts "from their Self" as opposed to being run by the reactivity caused by extreme or burdened Parts that have blended with them. This unblending is achieved through therapeutic methods aided and reinforced by the placement of balls or Parts on their pertinent rings relative to the always and already present central ball or Self and moving the balls along the concentric rings or to the "waiting room" space provided by the connecting structural rod. Thus, the Self-See3 provides spaces and places where Parts that have "stepped back" or unblended can be moved or placed while an individual works with a target Part or with Parts that are polarized. Once unblended, the third primary function provided by the Self-See3's design is utilized. It serves as a comprehensive and complete organizer of an individuals' internal psychological state and allows that individual to tangibly, visually, and interactively work with, heal, and reorganize Parts until balance and harmony within and between all Parts is achieved resulting in a genuine and sustaining experience of inner peace, clarity, and aliveness.

The balls are a smaller size relative to the Self, are movable and detachable, and are of a number and variety of colors, textures and insignia. They are of a relatively smaller size to indicate the leadership status and healing ability of the Self. They are movable and detachable to allow for the reflections of the unique inner constellations of individuals and the evolution and reorganization of their Parts under the leadership of the constant Self during the course of therapy and they are numerous and various to allow for the reflection and distinguishability of parts as they arise and transform.

The Self-See3's externalizing design allows for tracking Parts and their relationship to the Self and one another as they arise, move, change, and evolve during the course of therapy. The flexibility and simplicity of the design including the tilting, see-saw feature of the three(3) rings allows for reflecting, tracking, and addressing complex systemic imbalances or impasses such as polarities of Parts or inner conflicts and dilemmas and internal coalitions and alliances. Furthermore, internal, intrapersonal dynamics between Parts such as cutoffs, pursuer-distancer, optimist-pessimist, and ideas-feelings also exist and arise in external, interpersonal dynamics and can be tracked, reflected and addressed with interactive use of the Self-See3 with couples, families, groups and organizations.

Although intended primarily to express and apply the Internal Family Systems(sm) model of therapy, the Self-See3 has other uses including the following.

It can be used with children as a Feelings wheel and a Time-out wheel using the attachable balls to show differing feelings, thoughts, and physical sensations and the stationary central ball or the entire Self-See3 as themselves. Intensity or strength of the feeling can be expressed by how close or far the ball is placed from the central ball or Self.

The central ball can be used to represent constructs other than the Self such as a Goal or Vision with the balls representing thoughts, feelings and other reactions to what the central ball represents. Similarly, the central ball can be used as a brainstorming focus with the balls representing and tracking distinct ideas evoked. Connections between ideas can be made using the three concentric rings as an organizer as well as the connecting structural rod to reflect linkage.

Marital, relational, job, or career Commitment versus Satisfaction can be assessed, reflected, compared, tracked and addressed by dedicating separate rings and balls for each category of focus. Similarly, gender differences can be illustrated and focused on allowing for more effective couples communication, understanding, and acceptance.

The intersection of the rings by the connecting rod allows for a distinctive start and end point useful for externally scaling such things as levels of emotional or physical pain or progress of the therapy.

The Self-See3, because it is, among other things, a tool, can be used by practitioners of other psychotherapy models, particularly those whose theoretical base involves threes such as Gestalt (cliché/role layer, life layer, death layer), Cognitive-Behavioral (thoughts, feelings, behaviors) and psychoanalytic (id, ego, superego).

FIGS. 2-6 show the exemplary Self-See3 in various views. FIGS. 7-21 show photographs of an exemplary Self-See3 prototype with the balls disposed thereon in various formations and without the balls.

Generally, the Self-See3 is constructed of any material(s) sufficient to provide a durable therapeutic model intended for this uses discussed briefly above. For example, the rods and rings of the Self-See3 may be made of a metallic material and may be welded together. Referring to FIG. 1, the rod 14 which supports the rings 18 may be fitted by way of a universal joint or the like into the 12 gyroscopic ball to thus permit the rings 18 to rotate and/or pivot relative to the rod 14. The balls 20 are configured to be readily attached and detached from the rings 20 and may be configured, as shown in the drawings, to include a recess delimited to receive and retain the rings in a snap friction fit. The balls 20 may further be configured to be retained on the rings 18 but yet be movable, i.e., slidable, about the rings 18. The base 16 may be formed of any suitably weighted and constructed material so as to provide support to the remainder of the assembly but to still allow for portability thereof.

The Self-See3 is disclosed herein by way of example only and is not limited to the particular materials and configurations set forth above and in the attached Figures. For example, the Self-See3 may be constructed of a plastic material, etc. The balls 20 may be provided with a reusable adhesive or hook-and-loop attachment means, etc., in order to provide the desired attachability and detachability of the balls 20 relative to the rings 18. Herein, three concentric rings 18 are disclosed. Of course, the broad scope of the invention contemplates a fewer or greater number of rings as required for a particular application.

The Self$_C$ Mini is also intended for use in a situation game. The game, for example, may be entitled "What Would you Do?" or something similar. Two to five players partake in the game and utilize the colored balls describe herein. Using the balls, players attempt to guess what opposing players would do in specific situations provided. For example, in response to a situation presented, players may place their balls on the inner ring of the Self$_C$ Mini if they think an opposing player will choose a "head" or "thinking" response, the middle ring for a "heart" or "emotional" response or the outer ring for a "gut" or "instinctual" response. If the placement of balls on the rings is correct, that player's balls remain. All three responses, head, heart, and gut, are provided in specificity on the specific situation cards also provided with the game. The game is won when a player has successfully placed all of his/her colored balls on the Self$_C$ Mini.

In this context, the Self$_C$ Mini is essentially used as a counter or scorer, or more generally, as a visual indicator of a player's response and reactions in the various areas of head (thoughts and analysis), heart (emotions and feelings), and gut (visceral, instincts and reactions).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A therapeutic tool for use with a patient in psychotherapy, the tool comprising:

a central gyroscopic element;

a plurality of concentric rings extending around the central gyroscopic element; and a plurality of outer elements removably disposed on the rings and configured to be movable around the rings;

a ring member extending radially across each of the plurality of rings, the rings being disposed on and fixed directly to the ring member so as to be supported solely thereby and maintained in a concentric and coplanar arrangement, the ring member having a first end received at an interior of the gyroscopic element and fixed thereto and a second opposite end fixed to an outermost of said plurality of concentric rings, the ring member terminating at said second end;

a stand fixed directly to the central gyroscopic element and configured to support the therapeutic tool on a support surface, the stand comprising a slender elongated rod having a first end disposed proximate to the support surface and an opposite second end received at an interior of the gyroscopic element and fixed thereto, the stand further comprising a base configured to engage the support surface, where the second end of the rod is fixed to the base;

wherein the rings are pivotally associated with the gyroscopic element;

wherein the plurality of concentric rings is configured to pivot about the central gyroscopic element;

wherein the gyroscopic element is configured to indicate a seeing self of the patient and the rings are configured to indicate a plurality of subpersonalities of the patient; and wherein the outer elements each comprise a sphere with a central axis extending through the sphere, the sphere including a groove extending in a first direction through the sphere along the central axis, the groove extending in a second direction to a circumferential edge of the sphere, the second direction being perpendicular to the first direction; and wherein each sphere further includes an attachment mechanism disposed in the groove at the central axis, such that the groove receives any one of the plurality of concentric rings and retains said ring at the central axis by fixation of an attachment mechanism on the ring.

2. The therapeutic tool of claim 1, wherein the plurality of outer elements comprise a plurality of generally spherically shaped balls.

3. The therapeutic tool of claim 2, wherein each ball has a solid color.

4. The therapeutic tool of claim 2, wherein the plurality of rings comprise three rings with serially increasing diameters arranged around the central gyroscopic element.

5. The therapeutic tool of claim 2, wherein the plurality of concentric rings comprise three rings, the inner ring configured to indicate manager parts of the self, the middle ring configured to indicate firefighter parts of the self, and the outer ring configured to indicate exile parts of the self.

* * * * *